United States Patent
Six et al.

(10) Patent No.: US 10,270,621 B2
(45) Date of Patent: Apr. 23, 2019

(54) NETWORK SYSTEM

(71) Applicant: Alcatel Lucent, Boulogne-Billancourt (FR)

(72) Inventors: Erwin Six, Kalken (BE); Christele Bouchat, Antwerp (BE); Pascal Justen, Brussels (BE); Wim Henderickx, Westerlo (BE)

(73) Assignee: Alcatel-Lucent, France, NJ (US)

( * ) Notice: Subject to any disclaimer, the term of this patent is extended or adjusted under 35 U.S.C. 154(b) by 0 days.

(21) Appl. No.: 15/502,001

(22) PCT Filed: Aug. 24, 2015

(86) PCT No.: PCT/EP2015/069301
§ 371 (c)(1),
(2) Date: Feb. 6, 2017

(87) PCT Pub. No.: WO2016/030302
PCT Pub. Date: Mar. 3, 2016

(65) Prior Publication Data
US 2017/0230201 A1     Aug. 10, 2017

(30) Foreign Application Priority Data

Aug. 26, 2014  (EP) .................................... 14306314

(51) Int. Cl.
*H04L 12/28*  (2006.01)
*H04L 12/46*  (2006.01)
(Continued)

(52) U.S. Cl.
CPC ....... *H04L 12/4641* (2013.01); *H04B 1/0003* (2013.01); *H04L 12/28* (2013.01);
(Continued)

(58) Field of Classification Search
CPC . H04L 12/4641; H04L 12/28; H04L 63/0272; H04L 29/06; H04B 1/0003
See application file for complete search history.

(56) References Cited

U.S. PATENT DOCUMENTS

| | | |
|---|---|---|
| 2008/0189769 A1 | 8/2008 | Casado et al. |
| 2014/0172947 A1 | 6/2014 | Ghai et al. |
| 2014/0317293 A1* | 10/2014 | Shatzkamer ............ G06F 9/455 709/226 |

FOREIGN PATENT DOCUMENTS

| | | |
|---|---|---|
| CN | 1856790 A | 11/2006 |
| CN | 101714918 A | 5/2010 |

(Continued)

OTHER PUBLICATIONS

International Search Report PCT/ISA/210 for International Application No. PCT/EP2015/069301 dated Nov. 12, 2015.
(Continued)

*Primary Examiner* — Clemence S Han
(74) *Attorney, Agent, or Firm* — Harness, Dickey & Pierce, P.L.C.

(57) ABSTRACT

Network system comprising multiple access network gateways interconnected via networking equipment, each of the access network gateways being adapted for connecting user equipment devices to the network system, wherein the network system comprises a database wherein private networks are defined as groups of predetermined user equipment devices, and wherein the access network gateway are configured to interconnect user equipment devices belonging to a single private network via SDN service chains to emulate the single private network inside the network system.

13 Claims, 2 Drawing Sheets

(51) Int. Cl.
*H04L 12/64* (2006.01)
*H04L 29/06* (2006.01)
*H04L 12/24* (2006.01)
*H04B 1/00* (2006.01)

(52) U.S. Cl.
CPC ...... *H04L 12/6418* (2013.01); *H04L 41/0893* (2013.01); *H04L 63/0272* (2013.01); *H04L 12/287* (2013.01); *H04L 29/06* (2013.01)

(56) References Cited

FOREIGN PATENT DOCUMENTS

| CN | 103491015 A | 1/2014 |
|---|---|---|
| WO | WO-2008095010 A1 | 8/2008 |
| WO | WO-2014099963 A1 | 6/2014 |

OTHER PUBLICATIONS

Written Opinion of the International Searching Authority PCT/ISA/237 for International Application No. PCT/EP2015/069301 dated Nov. 12, 2015.
"OpenFlow-enabled SDN and Network Functions Virtualization" in the name of Open Networking Foundation, ONF Solution Brief, dated Feb. 17, 2014.
"Service Chaining in Carrier Networks" in the name of Gabriel Brown, on behalf of QOSMOS, dated Feb. 2015.
Zhu-liang, Yi, "Design and Implementation of Special Network Model with IP Centralized Management Function," Journal of Guangxi University for Nationalities (Natural Science Edittion), vol. 20, No. 1, Mar. 2014, pp. 84-87.
Wan, Z et al., "Basic Features and Typical Application Solution for SDN," Technology of Communication, No. 6, Jun. 2014, pp. 35-41.
Office Action from the Chinese Patent Office for CN Appl. No. 201580045318.4 dated Feb. 3, 2019, along with an English language translation.

* cited by examiner

NETWORK SYSTEM

CROSS-REFERENCE TO RELATED APPLICATIONS

This application is a national phase under 35 U.S.C. § 371 of PCT International Application No. PCT/EP2015/069301 which has an International filing date of Aug. 24, 2015, which claims priority to European Application No. 14306314.7, filed Aug. 26, 2014, the entire contents of each of which are hereby incorporated by reference.

TECHNICAL FIELD

The present invention relates to the field of networking. Particularly, the invention relates to a network system, network access device and a method for operating a network access device that allows to improve network user experience.

BACKGROUND

Home networks and private networks are widely known and used to create a private network context for groups of predetermined user equipment devices. Such private network context is typically implemented locally (both software and hardware), which local private network is then connected to the world wide web. In a private network context, users can easily share/retrieve data amongst each other, furthermore, data can be stored/synchronized at the network (for example via network attached storage devices), network and/or device usages can be controlled (for example parent control), services can be provided (for example climate control or smart TV control). These and other private network context functionalities are referred to as home services (although the invention is not limited to home environments as such). Because the private network context is implemented locally, only a predetermined group of user equipment devices can access the private network context, being the devices that are in the neighborhood (access range) of the network and the devices that have the required access data (passwords, . . . ). The latter ensures the security of the home network or private network.

A disadvantage of such home network and private networks is that devices can only access the network when in the neighborhood (access range) of the network. This can be solved by setting up private tunnels in the world wide web towards the home network or private network. Setting up of such tunnels is complex, and after setup a significant dataflow to and from the home network or private network is created.

Furthermore, it is a trend to virtualize home services by running home services elsewhere, for example in 'the cloud'. Thereby 'the cloud' is typically understood to be one or multiple servers that are located somewhere (actually anywhere) the world wide web. Such virtualization of services has multiple advantageous. At first, the equipment that is installed locally can be much more simple. This allows updating the service without locally updating networking equipment. Particularly when a service is delivered by the cloud to multiple individual private networks, it is easier to update the cloud than to update each of the individual private networks.

In home services, the private context is created/obtained by connecting to the private network. When the home services are virtualized, an extra authentication step is required. This extra authentication step is inherent to the current implementation of the virtualized home services, and forms a burden for users. Furthermore, for each service (or group of services), a separate authentication step is provided.

It is an object of the present invention to improve the network system.

SUMMARY

To this end, the invention provides a network system comprising multiple access network gateways interconnected via networking equipment, each of the access network gateways being adapted for connecting user equipment devices to the network system, wherein the network system comprises a database wherein private networks are defined as groups of predetermined user equipment devices, and wherein the access network gateway are configured to interconnect user equipment devices belonging to a single private network via software defined networks SDN service chains to emulate the single private network inside the network system.

According to the invention, access network gateways are configured to communicate with a database wherein the private networks are defined. Implementing the invention makes virtualized home services seamlessly connect to all their home devices via whatever access technology they connect to the network (Tablet via Wifi in the home vs. Tablet via public Wifi somewhere else, vs. Tablet via 3G or LTE, . . . ). This allows the access network gateways to gain knowledge regarding the 'relationships' between user equipment devices in the context of home or private networks. Since the access network gateway can gain such knowledge, the access network gateway according to the invention is configured to interconnect user equipment devices belonging to a single private network via SDN service chains. SDN service chains are known in the art and can be configured by the skilled person, SDN service chains allow the devices to communicate with one another in a private manner. Thereby, the home or private network is emulated in the network system (which is typically part of the world wide web). Thereby, it is noted that by applying the current invention, the device authentication to the access network gateway (which is a standard part of gaining access to the world wide web by any user equipment device) is sufficient to setup the SDN service chains so that no extra authentication step is required. As a result, the user will not suffer any difficulty in experiencing the advantages of the home or private network, even when the user is abroad (out of the neighborhood of the home or private network).

Preferably, the SDN service chains are implemented in Layer 2 of the network. In this manner, in the network that is typically an Ethernet network, a normal LAN environment can be emulated. This allows the user equipment devices to be interconnected in layer 2 of the network, which means that the user does not need to perform an extra authentication (this would be layer 3 of the network). In Layer 2, the device is authenticated and the network connection is established.

Preferably, the private networks defined in the database further comprise at least one service, and wherein the access network gateways are configured to further connect user equipment devices via SDN service chains to at least one server implementing the at least one service. Examples of services are given above in the background. These services can be implemented in 'the cloud'. By adding these services to the database, and by configuring SDN service chains between the user equipment devices of a private network and the servers implementing the services, users can benefit from these services from anywhere in the network. Thus the services can be used even when the user equipment device is out of the access range of the private network.

Preferably the access network gateways are provided to generate and manage a private context for each user equipment device. Thereby, the private context preferably defines the networking parameters for the user equipment device based on the database. These networking parameters can be set to have effect on the networking possibilities of the user equipment device in the network system. Where conventionally (for example) parent control (internet restrictions) can only be implemented on the device or on the local network, the present invention allows to implement such service at the gateway so that it is not device-related and it operates anywhere the user accesses the network.

Preferably the access network gateways comprise at least one of an access node and an access router for connecting home network devices to the network system and at least one access point for connecting a mobile device to the network system. This allows to integrate mobile networks with data networks (or multiple data networks: e.g. DSL and Cable networks). Mobile devices are more likely to connect to the network outside of the access range of the private network. By implementing the invention, the mobile devices stay connected to the private network, and home services can be accessed.

The invention further relates to a method for operating an access network gateway, the method comprising the steps of:
receiving a connection request from a user equipment device;
consulting a database wherein private networks are defined as groups of predetermined user equipment devices;
determining whether the user equipment device belongs to a private network based on said consulting; and
if said user equipment device is determined to belong to a private network, setup SDN service chains in the network to connect the user equipment device with other devices belonging to the private network.

Implementing this method results in effects and advantageous that are similar to the effects and advantages described above in relation with the network system. Therefor reference is made to the description above.

Preferably, the access network gateway generates and manages a private context for each user equipment device. The private context preferably defines the networking parameters for the user equipment device. These networking parameters can be set to have effect on the networking possibilities of the user equipment device in the network system. Where conventionally (for example) parent control (interact restrictions) only be implemented on the device or on the local network, the present invention allows to implement such service at the gateway so that it is not device-related and it operates anywhere the user accesses the network. Furthermore, an embodiment of the invention allows, via the L2 connectivity to make seamlessly accessible all personal photos & movies stored on the smart TV, or home recorder regardless of the location of the device.

The invention further relates to a digital data storage medium encoding a machine-executable program of instructions to perform the method of the invention.

The invention further relates to a access network gateway comprising a first communication module for connection via networking equipment to a network system, wherein the access network gateway further comprises a second communication module for connecting user equipment devices to the network system, wherein the access network gateway is adapted for communicating with a database wherein private networks are defined as groups of predetermined user equipment devices, and wherein the access network gateway is configured to interconnect user equipment devices belonging to a single private network via SDN service chains to emulate the single private network inside the network system.

Preferably, the access network gateway is an access node or an access router for connecting home network devices to the network system. Alternatively, the access network gateway is an access point for connecting a mobile device to the network system such as a SGW/PGW or a wifi public access router.

The invention further relates to a computer program product comprising computer-executable instructions for performing, when the program is run on a computer, the method of the invention.

BRIEF DESCRIPTION OF THE FIGURES

Some embodiments of apparatus and/or methods in accordance with embodiments of the present invention are now described, by way of example only, and with reference to the accompanying drawings, in which.

DETAILED DESCRIPTION OF EMBODIMENTS

Figure 1:
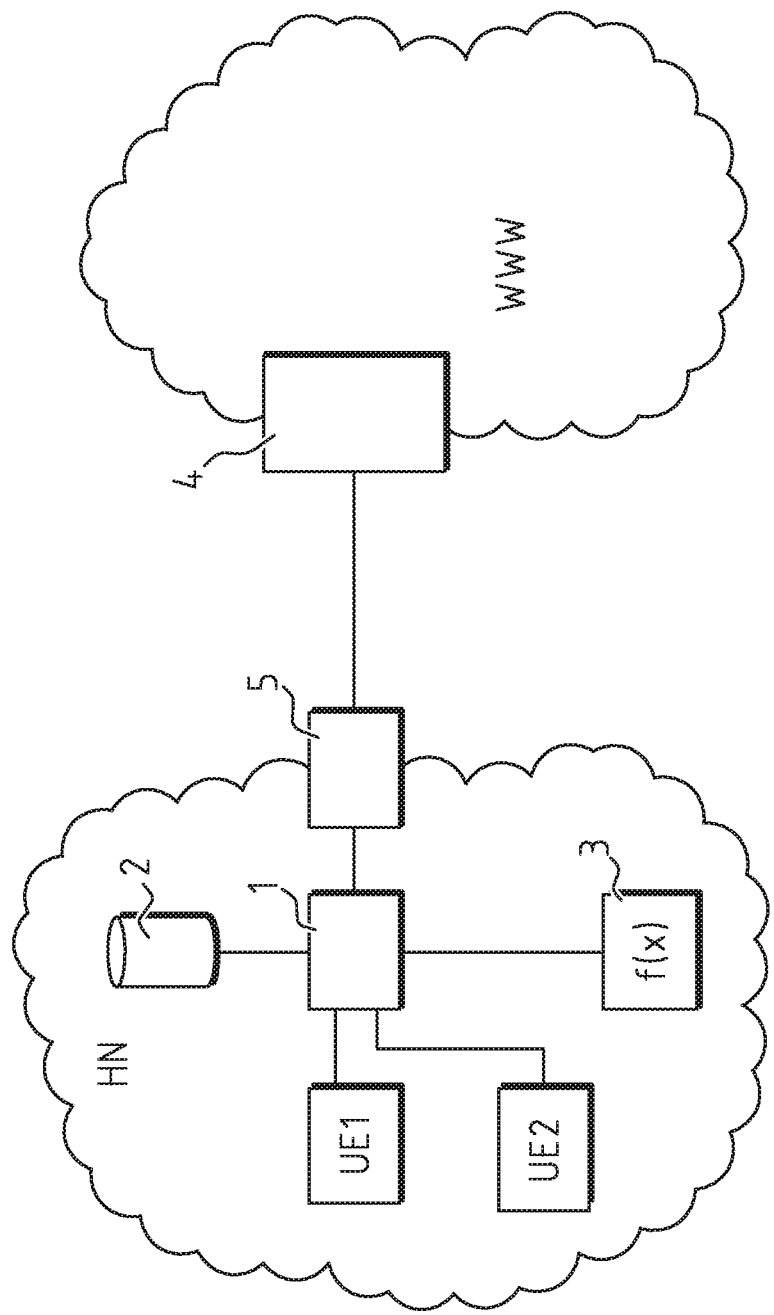
FIG. 1 illustrates a private network connected to a network system of the prior art.

FIG. 1 shows a private network HN according to the prior art. Such private networks are used for multiple purposes, for example for setting up a home network, residential network or small business network. These private networks are conventionally characterized by their limited geographical coverage. User equipment devices can connect to the private network via wired or wireless connection when the user equipment devices reside in the geographical area that is covered by the private network. Thereby the private networks are typically configured to recognize predetermined user equipment devices and to assign predetermined parameters (relating to network restrictions, services, . . . ) to the user equipment devices so that each user equipment device FIG. 1 shows two user equipment devices being UE1 and UE2. These user equipment devices are connected to the private network FIN via a home gateway 1. It will be clear to the skilled person that the UE1 and UE2 can be connected via wired or wireless connections. Furthermore, more or less user equipment devices can be connected to the private network HN. The home gateway 1 is provided to manage home services. Shown examples of home services are network attached data storage 2 and other services 3. Other services 3 are schematically shown in the figure and illustrate services such as network printer services, parent control services, network attached device control (smart TV, climate control, . . . ). Thereby in the private network FIN is typically configured to assign rights and restrictions to each user equipment device UE1 and UE2 in the network. Thereby, a private context is created for each user equipment device. The private context defines the networking possibilities for the user equipment devices. In the private context, internal communication between user equipment devices UE1 and UE2 that are present in the private network is significantly simplified. This allows user equipment devices UE1 and UE2 in the network to share data, services and resources. For example when one device UE1 is connected to a printer, the other device UE2 can print to the printer connected to the device UE1 via the private network.

FIG. 1 shows on the right hand side the network system, typically forming at least a part of the world wide web. The private network is connected to the network system via a access network gateway 4. At the private network side, a networking device 5 is provided to manage the network traffic between the User Equipment devices UE1 and UE2 and the network system. The home gateway 1 and networking device 5 can be integrated into a single apparatus, or can be implemented by multiple devices. In the prior art private networks, these home gateways 1 and networking devices 5 must be configured correctly to assign rights and restrictions to the user equipment devices UE1 and UE2 and to implement home services.

Recent trends have shown that certain services can be easily outsourced to the network system (www). Well known examples include online document storage. These network services are typically implemented in layer (or higher) of the network. As a result, the user needs to log onto the service to be able to access the service. This creates a burden to the user.

Figure 2:
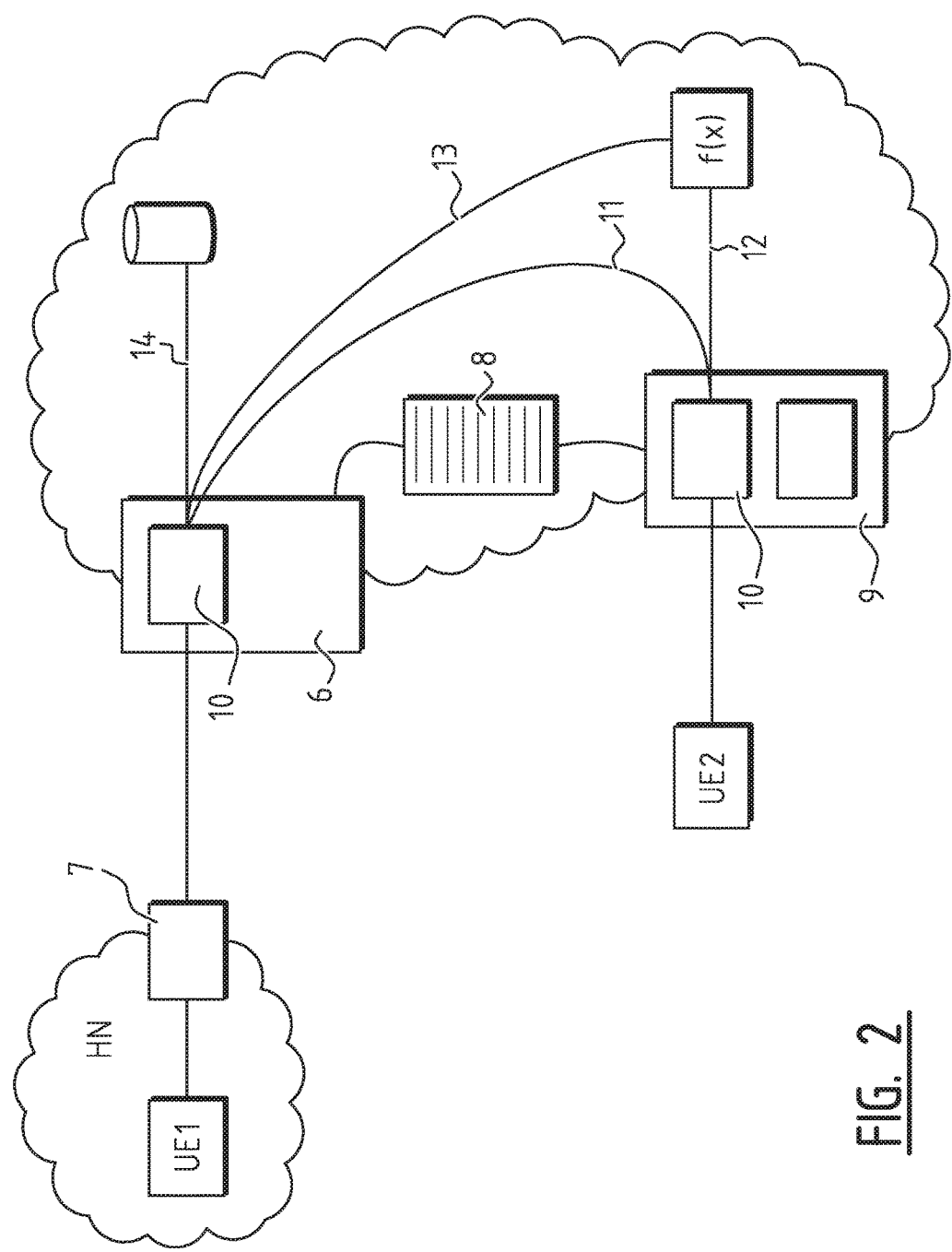
FIG. 2 illustrates a private network emulated in the network system of an embodiment of the invention.

FIG. 2 shows an embodiment of the invention. In FIG. 2, the private network is significantly less complex because (most) home services are moved out of the private network HN and into the network system (www). The private network HN is connected to the network system via an access network gateway 6 such as an access router or an access node. Examples of access network gateways that can be used in the invention are Broadband Network Gateway (BNG) or Intelligent Service Access Manager (ISAM) for xDSL; Service Gateway (SGW)/Packet Gateway (PGW) for 3GGP/LTE, . . . At the private network side, a simple networking device 7, or L2 device, such as a switch or bridge can be used. This simple networking device 7 is provided to allow user equipment devices (DEI in the example of FIG. 2) to connect to the private network FIN via wired and/or wireless connections. Because home services are outsourced to the network system (www), the networking device 7 at the private network end does not need complex mechanisms and managing functions to manage the home services.

At the access network gateway 6, the user equipment device UE1. (or the simple networking device 7) is identified at a Layer 2 level of the network so that the access network gateway can setup and manage networking connection for the user equipment device UE1 (or the simple networking device 7). This is a standard procedure when connecting any device to the network system (www). Thereby, wired network requests are typically identified via a line identification signal (e.g. DHCP option 82). Mobile network requests are typically identified via their SIM cards.

The access network gateway 6 of the invention is provided to communicate with a database 8, that is located at least somewhere in the network system. This database 8 defines private networks as groups of predetermined user equipment devices UE and optionally predetermined home services. Upon checking the database 8, the access network gateway 6 is provided to setup SDN service chains between the predetermined user equipment devices UE and optionally predetermined home services that are defined in the database 8. In this manner, a 'private network' is created inside the 'public network' (the network system being considered a public network). In this manner, the private network is emulated. SDN service chains allow interconnected devices to communicate and share data and services, in a private manner without extra permissions (these permissions are typically part of layer 3 of the network).

FIG. 2 shows an example wherein a first user equipment device UE1 is connected to the network system via a first access network gateway 6. A second user equipment device UE2 (for example a mobile phone) is connected to a second access network gateway 9. Since the first access network gateway 6 and the second access network gateway 9 are part of a single network system, the skilled person will understand that these gateways 6, 9 are interconnected via networking equipment and can communicate with each other. Each of the access network gateways 6, 9 is able to communicate with the database 8. In the FIG. 2, direct communication paths are shown between each access network gateway 6, 9 and the database 8, however it will be clear that an indirect communication path also enables the access network gateway 6, 9 to communicate with the database 8.

In the process of connecting a user equipment device UE1, UE2 to the network system via a access network gateway 6, 9, the user equipment device UE1, UE2 authenticates to the access network gateway 6, 9 so that the access network gateway 6, 9 can identify the user equipment device UE1, UE2. This knowledge of the user equipment device allows the access network a gateway 6, 9 to consult the database 8 and to check whether the user equipment device connecting to the network is part of a private network defined in the database 8. In case the database consultation reveals that the user equipment device is part of a private network, the access network gateway 6, 9 generates and manages a private context 10 for the user equipment device. A private context 10 is illustrated in the figures as a section of the access network gateway 6, 9 wherein the connection between the user equipment device and the network system is managed.

The access network gateway 6, 9 connecting the user equipment device UE1, UE2 to the network will retrieve from the database 8, upon detection that the user equipment device is part of a private network, information relating to other user equipment devices and/or home services that are part of that private network. This information is used by the access network gateway 6, 9 to interconnect the user equipment devices belonging to a single private network and to connect these user equipment devices to the servers implementing the home services. This is illustrated in FIG. 2 by the connection line 11, interconnecting the first user equipment device UE1 with the second user equipment device UE2. Further connection lines 12 and 13 are setup to connect respective user equipment devices with home service F(x) that is implemented in the network system. Another connection line 14 connects the first user equipment device UE1 with a network storage system that is implemented in the network. The second user equipment device UE2 is not directly connected to the network storage system. However it will be clear that the second user equipment device UE2 can indirectly access the network storage system via connection lines 11 and 14. Alternatively, the second user equipment device UE2 is, in the definition of the private network in the database 8, not allowed to access the network storage system, and is therefore not connected to the network storage system.

The connections 11, 12, 13 and 14 emulate the private network in the network system. As a result, the user equipment devices UE1, UE2 experience the network of FIG. 2 in the same manner as the network of FIG. 1, however without geographical restrictions. The connections 11, 12, 13 and 14 are formed by software defined network (SDN) service chains. These service chains preferably form network tunnels between the elements in the network so that communication can freely and securely run through the tunnels. Since the connections 11, 12, 13 and 14 are setup based on user equipment device logon to the network system and based on a database 8, no user authentication is required. Based on the description above, it will be clear that all services (F(x) and data storage) might be hosted in a virtual form somewhere on a cloud platform.

In the private context 10, network restrictions can be implemented based on information in the database 8. An example of implementing such network restriction is that internet access is only allowed via service F(x), and thus via communication line 12. This service can implement parent control so that the network usage is restricted for the user.

Although FIG. 2 shows a network system wherein only one private network is emulated, it will be clear that the network system can emulate a plurality of such private networks, one access network gateway can setup and manage multiple private contexts for multiple respective user equipment devices, as is illustrated in the second access network gateway 9, wherein two private contexts are shown.

Because in the embodiment of the invention the home services and network storage are part of the network system, these services and/or storage can be dynamically physically located in the network. When a user is on vacation and connects with its user equipment device to the network (in another country), the network system of the invention can decide to relocate or mirror the data in the network storage to a location closer to the user so that data traffic can be optimized.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A network system comprising
   a plurality of access network gateways interconnected via networking equipment, each of the access network gateways configured to connect user equipment devices to the network system; and
   a database configured to define emulated private networks as groups of predetermined user equipment devices,
   wherein the plurality of access network gateways are configured to interconnect user equipment devices belonging to a single emulated private network via software defined network (SDN) service chains to emulate the private network inside the network system, and
   the SDN service chains are implemented in Layer 2 of the network.

2. Network system according to claim 1, wherein the emulated private networks defined in the database further comprise at least one service, and wherein the access network gateways are configured to further connect user equipment devices via SDN service chains to at least one server implementing the at least one service.

3. Network system according to claim 1, wherein the access network gateways are provided to generate and manage a private context for each user equipment device.

4. Network system according to claim 3, wherein the private context defines networking parameters for the user equipment device based on the database.

5. Network system according to claim 1, wherein the access network gateways comprise at least one of an access node and an access router for connecting home network devices to the network system and at least one access point for connecting a mobile device to the network system.

6. Method for operating an access network gateway, the method comprising the steps of:
   receiving a connection request from a user equipment device;
   consulting a database wherein private networks are defined as groups of predetermined user equipment devices;

determining whether the user equipment device belongs to a private network based on the consulting, the private network being one of the private networks; and in response to determining that user equipment device belongs to the private network, setup software defined network (SDN) service chains in the network to connect the user equipment device with other devices belonging to the private network, wherein the SDN service chains are implemented in Layer 2 of the network.

7. Method according to claim 6, wherein the access network gateway generates and manages a private context for each user equipment device.

8. Method according to claim 7, wherein the private context defines networking parameters for the user equipment device.

9. A non transitory data storage medium including a machine-executable program of instructions to perform the method of claim 6.

10. A non transitory computer readable medium including computer-executable instructions for performing, when the computer-executable instruction are run on a computer, the method of claim 6.

11. Access network gateway comprising:
a first communication module configured to connect via networking equipment to a network system; and
a second communication module configured to connecting user equipment devices to the network system,
wherein the access network gateway is configured to communicate with a database wherein private networks are defined as groups of predetermined user equipment devices,
wherein the access network gateway is configured to interconnect user equipment devices belonging to a single private network via software defined network (SDN) service chains to emulate the single private network inside the network system, and
wherein the SDN service chains are implemented in Layer 2 of the network.

12. Access network gateway according to claim 11, wherein the access network gateway is an access node or an access router for connecting home network devices to the network system.

13. Access network gateway according to claim 11, wherein the access network gateway is an access point configured to connect a mobile device to the network system.

* * * * *